March 2, 1971    E. C. TIBBALS, JR    3,567,325
SYSTEM FOR STABLE POSITIONING OF INTERFEROMETER MIRRORS
Filed Aug. 31, 1967    2 Sheets-Sheet 1

FIG. I.

INVENTOR
EDWARD CAMP TIBBALS, JR.
BY
ATTORNEY

March 2, 1971     E. C. TIBBALS, JR     3,567,325
SYSTEM FOR STABLE POSITIONING OF INTERFEROMETER MIRRORS
Filed Aug. 31, 1967     2 Sheets-Sheet 2
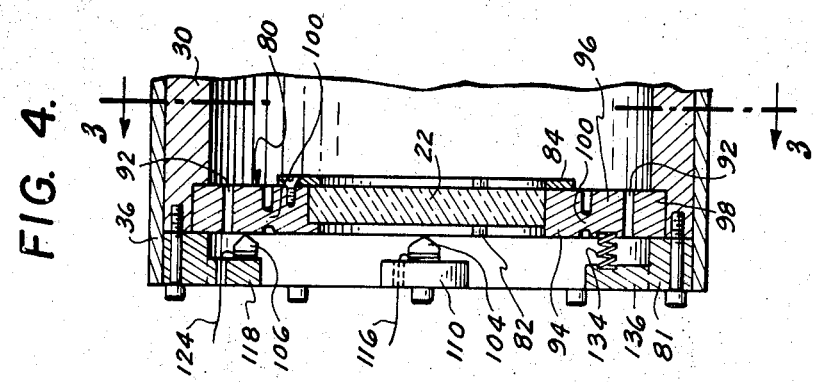
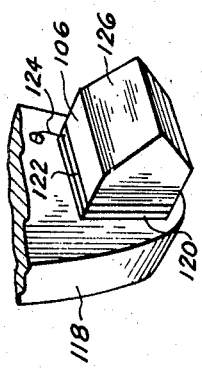
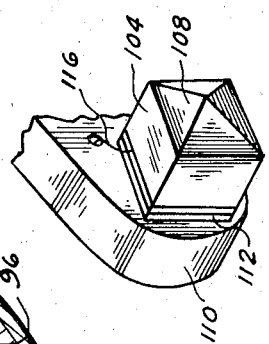
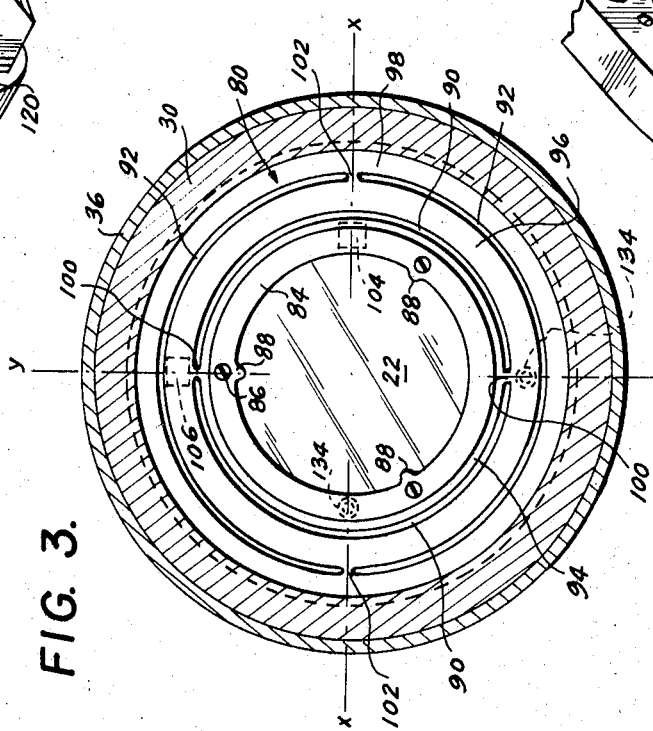
INVENTOR
EDWARD CAMP TIBBALS, JR
BY
ATTORNEY

United States Patent Office 3,567,325
Patented Mar. 2, 1971

3,567,325
SYSTEM FOR STABLE POSITIONING OF INTERFEROMETER MIRRORS
Edward Camp Tibbals, Jr., Boulder, Colo., assignor to Alexander Dawson, Inc., Mahwah, N.J.
Filed Aug. 31, 1967, Ser. No. 664,664
Int. Cl. G01b 9/02; H01s 3/00
U.S. Cl. 356—112                                6 Claims

ABSTRACT OF THE DISCLOSURE

A mirror of an interferometer cavity is mounted in a frame which is slotted to define integral gimbal rings connected by thin webs which can flex to permit angular displacement of the mirror about orthogonally related axes by applying suitably controlled voltages to piezoelectric crystals acting against the gimbal rings, whereby to angularly position the mirror in a stable manner, and the mirror mounted in such frame is positioned in the longitudinal direction of the cavity relative to the other mirror defining the cavity by means of a spacer member of quartz or other piezoelectric material having a voltage applied thereto which is varied in response to the photoelectric detection of the drifting of the emitted beam from a desired location so as to return the beam to that location.

---

This invention relates generally to cavities of the Fabry-Perot or Fizeau type interferometer, and more particularly is directed to improvements in the positioning of the mirrors which define such cavities so as to stabilize the same.

In a Fabry-Perot, or Fizeau interferometer cavity, the character of the emitted fringes is determined by the angular positioning of the mirrors defining the ends of the cavity, and any change in the length of the cavity will produce a drift or displacement of the emitted beam formed by focusing the transmitted fringes. For example, a change in the length of the cavity of the order of ¼ wavelength of the light transmitted therethrough can cause substantial shifting of the fringe positions which form the light focused into the emitted beam. It has, in the past, been very difficult to construct mountings for the mirrors which will exclude such small changes in the cavity length and which will concomitantly maintain the necessary angular positioning of the mirrors in the presence of external vibrations and temperature changes producing expansions and contractions of the mounting structure.

Accordingly, it is an object of this invention to provide a system for maintaining the desired length of an interferometer cavity in the presence of mechanical vibrations or temperature changes or other external factors.

Another object is to mount a mirror of an interferometer cavity so as to permit the precise and stable angular positioning thereof.

In accordance with an aspect of this invention, the mirrors of an interferometer cavity are positioned with respect to each other in the longitudinal direction by a structure that includes a piezoelectric spacer member having a voltage applied thereto which is varied in response to the photoelectric detection of the drift of the emitted beam from a desired location so as to return the beam to that location.

It is a function of the system embodying this invention to control the voltage applied to the piezoelectric spacer member independently of any change in the intensity of the emitted beam and also independently of oscillations intentionally imparted to the beam, as for scanning or other purposes.

In mounting a mirror of an interferometer cavity according to this invention, such mirror is clamped in a frame which is slotted to define integral concentric gimbal rings inter-connected by thin webs which can be selectively flexed for angular displacement of the mirror about orthogonally related axes by applying suitably controlled voltages to piezoelectric crystals acting against the gimbal rings, whereby to angularly position the mirror in a stable manner.

The above, and other objects, features and advantages of the invention, will be apparent in the following detailed description of an illustrative embodiment thereof which is to be read in connection with the accompanying drawings, wherein:

FIG. 1 is a schematic representation of a system for the stable positioning of interferometer mirrors in accordance with this invention;

FIG. 3 is a transverse sectional view taken on the line 3—3 of FIG. 4, and showing the structural features of a frame for mounting an interferometer mirror according to this invention;

FIG. 4 is a sectional view taken along a line corresponding to the axis y—y on FIG. 3; and FIGS. 5 and 6 are enlarged perspective views showing crystals by which the mounting of FIGS. 3 and 4 can be selectively adjusted.

Figure 2:
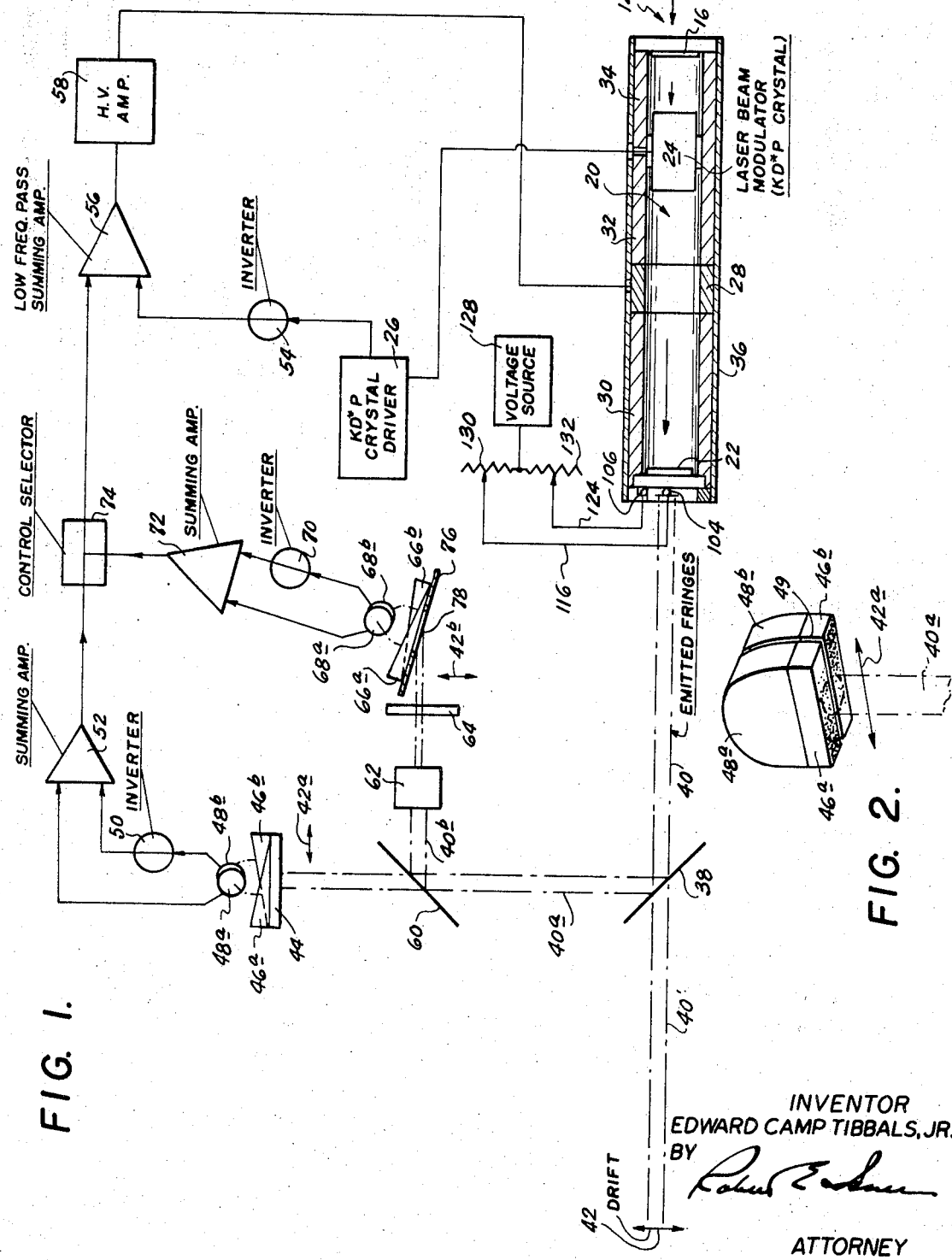
FIG. 2 is a detail perspective view showing a pair of drift detecting optical wedges and associated sensors included in the system of FIG. 1.

Referring to FIG. 1 of the drawings, the present invention is there shown as applied to the stabilization of an interferometer cavity, for example, as employed in an optical scanning apparatus of the type disclosed in U.S. patent application Ser. No. 636,077, filed May 4, 1967, by John Richard Wilson, Jr. In such apparatus, as shown schematically, a source 10 of coherent monochromatic light, such as a continuous wave, gas or crystal laser, has an end mirror 12 which defines one end of a first interferometer cavity 14, the other end of which is defined by the reflective surface of a mirror element 16. Disposed within the cavity 14 is a telescope sub-assembly 18 of such character as to present, with small distortion, a magnified image of the laser beam for the production of interference fringes characteristic of either a Fabry-Perot or Fizeau type interferometer at the second mirror element 16. A second interferometer cavity 20 is placed in tandem with the first cavity 14 and is formed by the reflective surface of mirror element 16 and the reflective surface of a third mirror element 22. Disposed within the second interferometer cavity is a beam modulator or control crystal assembly 24 that includes a crystal capable of exhibiting the Pöckels effect, for example, a KD*P (potassium dihydrogen phosphate) crystal preferably enriched with deuterium, and having electrodes secured to appropriate faces of the crystal for connection to an external source 26 of high voltage capable of being oscillated over a wide range of frequencies.

As is characteristic of a Fabry-Perot interferometer cavity, parallel disposition of the reflective surface of mirror element 16 with the laser end mirror 12 will result in the production of a set of concentric fringes at the second mirror 16. If the second mirror element is tilted about its horizontal or vertical axis to form a wedge-shaped cavity, a set of straight fringes characteristic of the Fizeau type will be produced at mirror element 16. Actually, the first interferometer cavity 14 may be considered a filter transmitting a beam in selected position to the second cavity 20, and, when such beam has the correct directional and phase characteristics, it is further transmitted and produces a final pattern having peak intensities determined by the several peak transmission factors.

When the interferometer cavities are adjusted to provide for optimum fringe intensity distribution, application of high voltage to the laser beam modulator or control crystal assembly 24 produces an electric field across the crystal thereof, a linear variation in the index of refraction of the crystal in accordance with the magnitude of the applied electric field and a concomitant change in the phase of the incident light. Such variation in phase effects a change in the optical path length within the cavity 20 and is equivalent to altering the distance separating the mirror elements 16 and 22. The alteration of the effective length of the second interferometer cavity 20 produces a displacement of the fringes in a direction perpendicular to the length thereof across the field of view. If the voltage applied to crystal assembly 24 from the source or driver 26 is of an alternating character, the fringes will oscillate at the applied frequency. Such motion or reciprocative displacement of the emitted straight line fringes may be projected through an auxiliary projection lens assembly (not shown) and, after focussing into a high intensity spot, may be directed on a surface to scan data, characters or the like, appearing thereon, as disclosed in U.S. patent application, Ser. No. 636,077, identified fully above, and in U.S. patent application, Ser. No. 636,204, filed May 4, 1967, by Edward Camp Tibbals, Jr., and Trevor Temple.

Since the intended displacement of the emitted fringes results from alteration of the effective length of cavity 20, it is apparent that any change in the actual cavity length or distance between mirrors 16 and 22, for example, as a result of vibrations or thermal expansion or contraction of the mounting structure, will produce an undesired drift or displacement of the fringes apart from that occurring by reason of the operation of the beam modulator or crystal assembly 24. Such drift of the deflected beam will obviously interfere with the employment thereof for scanning purposes, as mentioned above.

In accordance with this invention, there is provided, in association with an interferometer cavity, a system which detects any drift of the emitted fringes by reason of deviation of the interferometer cavity from a predetermined length and, in response to detection of such drift causes a selective relative displacement of the mirror elements defining the cavity so as to restore the interferometer cavity to its original or predetermined length.

A suitable arrangement of the essential component elements of a system to achieve such result in shown on FIG. 1 and includes a ring 28 of piezoelectric material of high structural stability, such as quartz, interposed in a stack of spacer cylinders 30, 32 and 34 by which the mirror elements 16 and 22 and control crystal assembly 24 of interferometer cavity 20 are longitudinally positioned with respect to each other within a rigid tubular casing 36. The spacer cylinders 30, 32 and 34 are desirably formed of a non-expanding material, for example, a ceramic such as cermet or a metal such as Invar.

It will be apparent that the quartz ring 28 can be operated in a piezoelectric manner by the application of a suitably variable voltage thereto for either increasing or decreasing its axial dimension and thereby displacing mirror element 22 relative to mirror element 16 in the longitudinal direction of casing 36.

In order to accurately detect drifting of the emitted fringes and to correspondingly control the voltage applied to quartz ring 28 so as to eliminate such drift, the system embodying this invention is shown to include a beam splitter 38 interposed in the beam 40 emitted by cavity 20. A major proportion, for example, 98%, of the light energy is allowed to pass through beam splitter 38, as at 40', for use in scanning as previously described, and the balance of the light energy is reflected in a beam 40a which is displaced in the direction of the arrows 42a upon drift of the beam 40' in the direction of the arrows 42.

Interposed successively in the path of beam 40a are a narrow band pass filter 44 which transmits the frequency of the emitted light and a pair of optical wedges 46a and 46b which are disposed side by side and located so that the adjacent edges of the wedges bisect the cross-section of beam 40a (FIG. 2). The optical wedges 46a and 46b may be formed of rectangular bars of glass having their surfaces against which beam 40a impinges partially silvered so as to provide transmission gradients that are reversed with respect to each other. In the arrangement shown on FIG. 2, for example, the density of the silver sputtering on wedge 46a increases from right to left, and the density of the silver sputtering on wedge 46b increases from left to right. Thus, when beam 40a is centered along wedges 46a and 46b, equal quantities of light are transmitted therethrough. If beam 40a is displaced toward the left from the position shown, the quantity of light transmitted through wedge 46a is decreased and the quantity of light transmitted through wedge 46b is increased. Conversely, if beam 40a is displaced toward the right, the quantities of light transmitted through wedges 46a and 46b are increased and decreased, respectively.

The optical wedges are separated by a dividing partition 49 (FIG. 2) and the light passing through the divided optical wedges 46a and 46b is received by photoelectric sensors 48a and 48b, respectively. The output of sensor 48b is electronically inverted, as at 50, and summed with the output of sensor 48a, as by a summing amplifier 52, thereby providing a positive output at the summing junction of amplifier 52.

It will be apparent that, if the beam 40a remains motionless but has its intensity changed, as by modulation of the intensity of the beam, the light intensities sensed by both sensors 48a and 48b will change equally. Thus, the outputs of both sensors 48a and 48b will either increase or decrease equally, but, due to the summing of the output of sensor 48a with the inverted output of sensor 48b, there will be no change in the output at the summation point of amplifier 52. However, if beam 40a is displaced along wedges 46a and 46b from its centered position, the intensity of light transmitted by one of the wedges and received by the related one of the sensors 48a and 48b will be increased and the intensity of light transmitted by the other wedge and received by the respective sensor will be correspondingly decreased. By reason of the inverting of the output of sensor 48b, the increase in the output of one sensor and the decrease in the output of the other sensor will be added to each other at the output of amplifier 52 and thereby provide a relatively large signal differential indicating the detected displacement of the beam.

Of course, when the beam 40 is made to oscillate by the application of an alternating voltage to crystal assembly 24, the corresponding oscillation or reciprocation of beam 40a relative to wedges 46a and 46b will result in a varying voltage at the output of summing amplifier 52 which must not be confused or misinterpreted as an undesired drift of the emitted beam. Thus, in the system shown on FIG. 1, a portion of the output of crystal driver 26 is electrically inverted, as at 54, and summed with the output of amplifier 52, as by a low frequency band pass summing amplifier 56. The arrangement is such that, so long as the oscillation of beam 40a is symmetrical about its neutral or centered position along wedges 46a and 46b, the output from amplifier 56 will not vary. However, if the center of oscillation of beam 40a is shifted to one side or the other of its neutral position with respect to the paired wedges 46a and 46b, as by a drift of the beam, the output of amplifier 56 is varied accordingly, and such output is fed through a high voltage amplifier 58 to quartz ring 28 to vary the axial dimension of the latter in the sense to eliminate the detected drift.

In the above described portion of the system embodying this invention, the surfaces of wedges 46a and 46b against which beam 40a impinges lie in a plane that is perpendicular to the longitudinal axis of the beam in the centered or neutral position of the latter. Thus, such portion of the system is effective to compensate for gross or relatively large drifts of the beam and may be combined with an arrangement to correct for fine deviations or drifts of the beam. Such arrangement, as shown on FIG. 1, may include a beam splitter 60 interposed in beam 40a and reflecting a portion of the light energy of the latter into a beam 40b. Interposed successively in beam 40b may be an optical telescope subassembly 62 which merges or narrows the beam and focusses the same through a narrow band pass filter 64 selectively transmitting the emitted light onto a pair of optical wedges 66a and 66b which are similar to wedges 46a and 46b and associated with photoelectric sensors 68a and 68b, respectively.

The wedges 66a and 66b, having transmission gradients that are reversed with respect to each other, are also arranged so that the dividing partition between the adjacent edges of the wedges bisects the area at which beam 40b impinges on the surfaces of the wedges and lies in a plane that includes the direction of displacement of beam 40b indicated by the arrows 42b. Further, wedges 66a and 66b are located so that beam 40b is centered therealong when such beam is at its neutral position, at which position of the beam wedges 66a and 66b transmit equal quantities of light to their respective sensors 68a and 68b. However, as shown, wedges 66a and 66b have their surfaces against which beam 40b impinges disposed in a plane forming a small angle with respect to the direction of beam 40b so that even a small drift of beam 40b in the direction of arrows 42b results in a relatively large displacement of the beam along the faces of wedges 66a and 66b and thereby causes a relatively large increase or decrease in the light energy received by the associated sensors 68a and 68b.

The output of sensor 68b is electrically inverted, as at 70, and summed with the output of sensor 68a in a summing amplifier 72 to provide an output at the summing junction of the latter which is independent of variations of intensity of the beam of fringes emitted by the interferometer. The outputs of amplifiers 52 and 72 are connected to amplifier 56 through a control selector 74 which blocks the output from amplifier 52 so long as there is an output signal from amplifier 72 and transmits the signal from amplifier 72 to amplifier 56, and which, when there is no signal from amplifier 72, permits any output signal from amplifier 52 to pass to amplifier 56.

In order that the wedges 66a and 66b and associated circuitry will be effective to control the length of interferometer cavity 20 only when such length is at or near the desired dimension, that is, will correct only for small drifts of the emitted beam, the inclined surfaces of wedges 66a and 66b have a mask 76 with a restricted opening 78 disposed thereagainst. The beam 40b will impinge on wedges 66a and 66b only when such beam is at or near its desired or neutral location. Thus, in the event of a relatively large drift of the emitted beam 40, beam 40b strikes the opaque portion of mask 76 to exclude any signal from amplifier 72, while the wedges 46a and 46b and sensors 48a and 48b detect such large drift and produce a corresponding signal at the output of amplifier 52 to be transmitted through control selector 74 for correction of the drift. On the other hand, in the event of a small drift of the emitted beam, beam 40b impinges on wedges 66a and 66b through opening 78 of mask 76 and results in a signal from amplifier 72 which is transmitted through selector 74 to the exclusion of any signal from amplifier 52 and which effects a fine correction of the cavity length.

The above described system of FIG. 1 is effective to maintain a desired longitudinal distance between the mirror elements defining an interferometer cavity. However, it is also necessary to effect precise and stable angular positioning of such mirror elements. In accordance with this invention, the above purpose is achieved by providing an interferometer mirror, for example, the mirror element 22, with an annular mounting frame 80 (FIGS. 3 and 4) which is secured in an end of spacer cylinder 30 by a retaining ring 81. The mirror element 22 is received in the central opening of frame 80 and seats against three equally spaced lugs or ears 82 (FIG. 4) which project radially inward from the inner periphery of frame 80 at one side of the latter. The mirror element 22 is held against lugs 82 by a clamping ring 84 secured to frame 80, as by screws 86 (FIG. 3), and having three lugs or ears 88 positioned to register exactly with lugs 82 and to engage the mirror element at the opposite side of frame 80. Since the mirror element 22 is only engaged by the equally spaced lugs 82 and 88 at its opposite faces, distortion of the flatness of the mirror element by reason of the clamping thereof in frame 80 is minimized.

Between its inner and outer peripheries, frame 78 is formed with two radially spaced sets of semi-circular slots 90 and 92 which divide the frame into an inner gimbal ring 94 in which the mirror element is mounted, an outer gimbal ring 96 concentric therewith and a mounting ring 98 also concentric therewith at which frame 80 is secured to spacer cylinder 30. Semi-circular slots 90 have their adjacent ends spaced apart at diametrically opposed locations to leave thin webs 100 which can flex to permit overall angular displacements of inner gimbal ring 94 relative to outer gimbal ring 96 about the axis y—y (FIG. 3). Similarly, semi-circular slots 92 have their adjacent ends spaced apart at diametrically opposed locations to leave thin webs 102 spaced by 90° from the webs 100 and which can flex to permit overall angular displacements of outer gimbal ring 96 relative to mounting ring 98 about the axis x—x. The slots 90 and 92 which separate the gimbal rings are made as narrow as possible, for example, with a width of .010 to .020 inch, to minimize the distortion at the webs 100 and 102 when angular displacements are effected about the axes y—y and x—x.

In accordance with this invention, angular displacements of the mounted mirror 22 about axes y—y and x—x are selectively effected by piezoelectric crystals 104 and 106, respectively, which act against gimbal rings 94 and 96. Crystal 104 is located with respect to inner gimbal ring 94 midway between webs 100 defining its pivots and is shaped, for example, pyramidally as at 108 on FIG. 5, for point contact with grounded ring 94. Crystal 104 is secured to a lug 110 (FIGS. 4 and 5) projecting radially inward from retaining ring 81 with insulation 112 therebetween for electrically isolating one end of crystal 104 from the mount. The end face of crystal 104 which is insulated from mounting lug 110 has an electrode 114 thereon to which a voltage can be applied by way of a conductor 116. Similarly, crystal 106 is secured at one end to a lug 118 projecting radially from ring 81 (FIG. 4) with insulation 120 interposed between lug 118 and the adjacent end of the crystal (FIG. 6) on which an electrode 122 is provided for receiving a voltage applied through a conductor 124. The crystal 106 is located with respect to gimbal ring 96 midway between webs 102 defining its pivots and is chisel shaped, as at 126, for contact with grounded ring 96 at a line parallel to the axis x—x of its pivoting movement. By applying suitably controlled electrical voltages to electrodes 114 and 122 of crystals 104 and 106 through conductors 116 and 124, rings 94 and 96 are displaced relative to retaining ring 81 at the locations of the crystals and thereby are angularly displaced about axes y—y and x—x, respectively, to effect corresponding angular adjustments of the mounted mirror element 22. As shown on FIG. 1, the voltages thus applied to crystals 104 and 106 from a source 128 may be simply controlled by potentiometers 130 and 132, respectively.

In order to retain rings 94 and 96 in contact with the tips of crystals 104 and 106, respectively, there may be provided compression springs 134 (FIGS. 3 and 4) which bear at one end against rings 94 and 96 at locations diametrically opposed to the locations of contact with such rings by crystals 104 and 106. As shown on FIG. 4 with respect to the spring 134 acting against ring 96, each spring 134 may seat in a socket or recess in the respective ring and have its other end bearing in a similar socket or seat provided in a lug 136 projecting radially from ring 81. Thus, rings 94 and 96 will follow, by corresponding angular displacements thereof, electrically induced expansions and contractions of the respective crystals.

Since there is no play in the pivots for the gimbal rings 94 and 96 or in the piezoelectric crystals 104 and 106 by which such gimball rings are angularly positioned, the mounted mirror element 22 has its angular disposition determined in a stable manner by a structural arrangement that is relatively simple and inexpensive to produce.

Although an illustrative embodiment of this invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A system for maintaining a predetermined distance between the end mirrors of an interferometer cavity which emits a beam formed by focussing transmitted fringes, comprising a cylindrical mounting structure having said mirrors disposed at the terminal ends thereof and defining said interferometer cavity, a piezoelectric spacer member disposed in engagement with said mounting structure intermediate said mirrors for selectively controlling the magnitude of the longitudinal separation of said mirrors in accord with the longitudinal extent thereof, a source of electric voltage applied to said spacer member to control said distance between the mirrors by selective variation of the longitudinal extent of said spacer member, means to detect physical displacement of said emitted beam resulting from a deviation in longitudinal spacing of said end mirrors from said predetermined distance including beam splitting means to reflect a relatively small proportion of the light energy in said beam, optical wedge means comprising a pair of optical wedges having selectively opposed transmission gradients interposed in the reflected beam so that the intensity of light transmitted through each of said optical wedge means is complementally varied in opposing relation in response to displacement of the emitted beam, and individual photoelectric sensor means selectively acted upon by the light transmitted through each said wedge so as to have an output whose magnitude varies with the magnitude of such displacement, and means operative in response to the magnitude of the detected physical displacement to vary the voltage applied from said source to said spacer member in the sense to return said end mirrors to said predetermined distance therebetween.

2. A system according to claim 1, in which said beam splitting means reflects a relatively small portion of the light energy of said emitted beam into first and second reflected beams, said optical wedge means includes first and second optical wedge means having selectively opposed transmission gradients interposed in said first and second reflected beams, respectively to complementally vary the intensities of light transmitted through said wedge means in opposed relation in accordance with the displacement of said emitted beam, and said photoelectric sensor means includes first and second sensor means, respectively, receiving the light transmitted through said first and second wedge means so as to have outputs that vary according to the intensities of light transmitted through the respective wedge means, said second wedge means being disposed relative to said second reflected beam so as to provide said second sensor means with a rate of change of its output that is greater than the rate of change of the output of said first sensor means in responsive to a displacement of said omitted beam and means masking said second wedge means from said second reflected beam in all positions of the latter corresponding to displacement of said emitted beam beyond predetermined small limits, and in which said means to vary the voltage applied to said spacer member is controlled by said output of the second sensor means so long as there is an output therefrom and by said output of the first sensor means when there is no output from said second sensor means, thereby to provide a fine control for maintaining said predetermined distance between the mirrors upon displacement of said emitted beam between said small limits and a coarse control for returning said beam to within said small limits when said displacement exceeds such limits.

3. A system according to claim 1, in which said means to vary the voltage applied to said spacer member includes means to invert the output of one of said sensors, and means summing the inverted output of said one sensor with the output of the other of said sensors to provide a summed output which controls said voltage independently of variations in the intensity of said emitted beam.

4. A system according to claim 1, further comprising beam modulating means disposed in said cavity and driver means to apply an alternating voltage to said modulating means for effecting oscillation and physical displacement of said emitted beam, and said means to vary the voltage applied to the spacer member includes means inverting a portion of the output of said driver means and means summing said output of the sensor means with the inverted portion of the output of said driver means to provide a summed output controlling the voltage applied to the spacer member independently of said oscillation of the emitted beam by said beam modulating means.

5. A system according to claim 4, wherein the output of one of said sensors is inverted and summed with the output of the other of said sensors to constitute said output of the sensor means which is independent of variations in the intensity of said emitted beam.

6. A system according to claim 2, in which said first optical wedge means is disposed substantially at right angles to the direction of said first reflected beam and has transmission gradients varying thereacross, and said second optical wedge means has substantially the same transmission gradients as said first wedge means and is disposed in a plane at a relatively small angle to the direction of said second reflected beam.

References Cited

UNITED STATES PATENTS

| | | | |
|---|---|---|---|
| 3,404,352 | 10/1968 | Bowness | 331—94.5 |
| 3,431,514 | 3/1969 | Oshman et al. | 331—94.5 |
| 3,422,689 | 1/1969 | Fladlien et al. | 331—94.5 |
| 3,477,036 | 11/1969 | Haisma | 331—94.5 |

RONALD L. WIBERT, Primary Examiner

C. CLARK, Assistant Examiner

U.S. Cl. X.R.

331—94.5